United States Patent [19]

Nakayama

[11] Patent Number: 5,657,366
[45] Date of Patent: Aug. 12, 1997

[54] FILM MARKERS FOR SPECIFYING BODY POSTURES OF ANIMAL PHOTOGRAPHED IN ROENTGENOGRAMS

[76] Inventor: Masanari Nakayama, 6 - 1, Minamifukurocho, Nara-city, 630, Japan

[21] Appl. No.: 393,401

[22] Filed: Feb. 23, 1995

[51] Int. Cl.⁶ ..................................................... H05G 1/28
[52] U.S. Cl. ........................................... 378/165; 378/163
[58] Field of Search ..................................... 378/165, 163

[56] References Cited

U.S. PATENT DOCUMENTS 5,415,546   5/1995   Cox, Sr. .................................. 433/213

Primary Examiner—Don Wong

[57] ABSTRACT

Film markers for specifying body postures of an animal photographed in roentgenograms are described. The marker includes an animal-symbolizing member that shows the contour of an animal and a base member that symbolizes the top plate of a X-ray photographic table. These members are made of a roentgenopaque material and embedded in a synthetic resin plate. By irradiating a X-ray film cassette with this film marker put on one corner of the cassette, four body postures of prone, supine, laterally recumbent, and obliquely recumbent positions of an animal photographed can be visually specified at a glance by any person.

2 Claims, 4 Drawing Sheets

FILM MARKERS FOR SPECIFYING BODY POSTURES OF ANIMAL PHOTOGRAPHED IN ROENTGENOGRAMS

BACKGROUND OF THE INVENTION

1. Field of the Invention

The present invention relates to a film marker for specifying the body postures of an animal photographed in roentgenograms. According to the application of the film marker of the present invention, the body posture of an animal's skeleton in an image photographed in a roentgenogram can be specified at a glance by a veterinarian belonging to any country in the world, because the film marker of the present invention is expressed by a symbol, i.e. the figure of an animal being common to the whole world.

2. Description of the Related Art

In the case when animals are photographed in roentgenograms, body postures of an animal to be photographed are basically the following four positions. Namely, they are (1) a prone position wherein an animal is laid on a photographic table with its face down and photographed dorsally (dorsal: D), (2) a supine position wherein an animal is laid on a photographic table with its face up and photographed ventrally (ventral: V), (3) a lateral position wherein an animal is laid on a photographic table with its face sideways and photographed laterally (lateral: L), and (4) an oblique position wherein an animal is held on a photographic table in its slant position and photographed obliquely (oblique: O). In addition, it is necessary for discriminating a right-hand (right: R) photograph from a left-hand (left: L) one in both the cases of the lateral and oblique positions, respectively.

When the whole body of an animal is photographed panoramically, the body posture of the animal in the photograph is quite obvious. However, there were many cases where body postures of an animal photographed in roentgenograms were not clear in the event when the animal was partially photographed, for example, only a backbone or a hip joint of the animal was photographed. Under the circumstances, sheets of alphabetical characters such as "D", "V", "L", "O" as well as "R" and "L" made of a metal such as lead have heretofore been attached to the outside of a film cassette with an adhesive tape at the time of photographing in the United States of America and the other English-speaking countries for recording the body posture of the animal photographed on the film. More specifically, alphabetical characters "LL" appeared on any corner of an X-ray film represents a left-handedly laterally recumbent position of an animal photographed, and characters "RL" on any corner of an X-ray film means a right-handedly laterally recumbent position of an animal photographed, respectively.

While it is self-evident for American veterinarians that an alphabetical character "D" means a prone position, and a character "V" means a supine position, respectively, such indications by alphabetical characters based on English terms are unfamiliar for the peoples other than English-speaking peoples, so that there is a possibility of misunderstanding for the former peoples in case of examining skeletons of animals photographed in roentgenograms to which have been applied unfamiliar indications. On the other hand, if such indications have been applied to roentgenograms by employing the characters other than alphabetical characters, e.g. Chinese or, Arabic characters, the peoples who are unfamiliar for these characters or languages are very inconvenient or substantially impossible to use the indications based on these characters. In such a case, the application of a film marker onto any corner of a roentgenogram is almost useless for specifying body postures of an animal to be photographed.

OBJECT AND SUMMARY OF THE INVENTION

In view of the above, the present invention has been made to eliminate the above described disadvantage, and an object of the invention is to provide X-ray film markers being in common to the whole world by which the body postures of animal's skeletons photographed in roentgenograms can be specified at a glance by any veterinarian who belongs to any country in case of examining the roentgenograms.

In order to attain the above described object, the film marker according to the present invention Is characterized by an animal-symbolizing part which Is obtained by designing the figure of an animal to be photographed with a roentogenopaque material, and a base part made of roentogenopaque material which symbolizes the top of an X-ray photographic table. The X-ray film markers of the present Invention are used In place of conventional lead markers for expressing alphabetical or the other characters.

In the present invention, the above described X-ray film markers may also comprise only the animal-symbolizing part which is obtained by designing the figure of an animal to be photographed with a roentogenopaque material without accompanying the aforesaid base part.

According to the X-ray film markers of the present invention, body postures of an animal laid on a roentogenographic table can be specified in X-ray films photographed on the basis of positional relationships between the animal-symbolizing part and the base part which are photographed at the same time of photographing the skeleton of the animal in the corresponding body posture.

Thus, according to the X-ray film markers of the present invention, the body postures of an animal which have been photographed on X-ray films can be visually specified at a glance in comparison with conventional film markers indicating any characters which require interpretation of meanings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
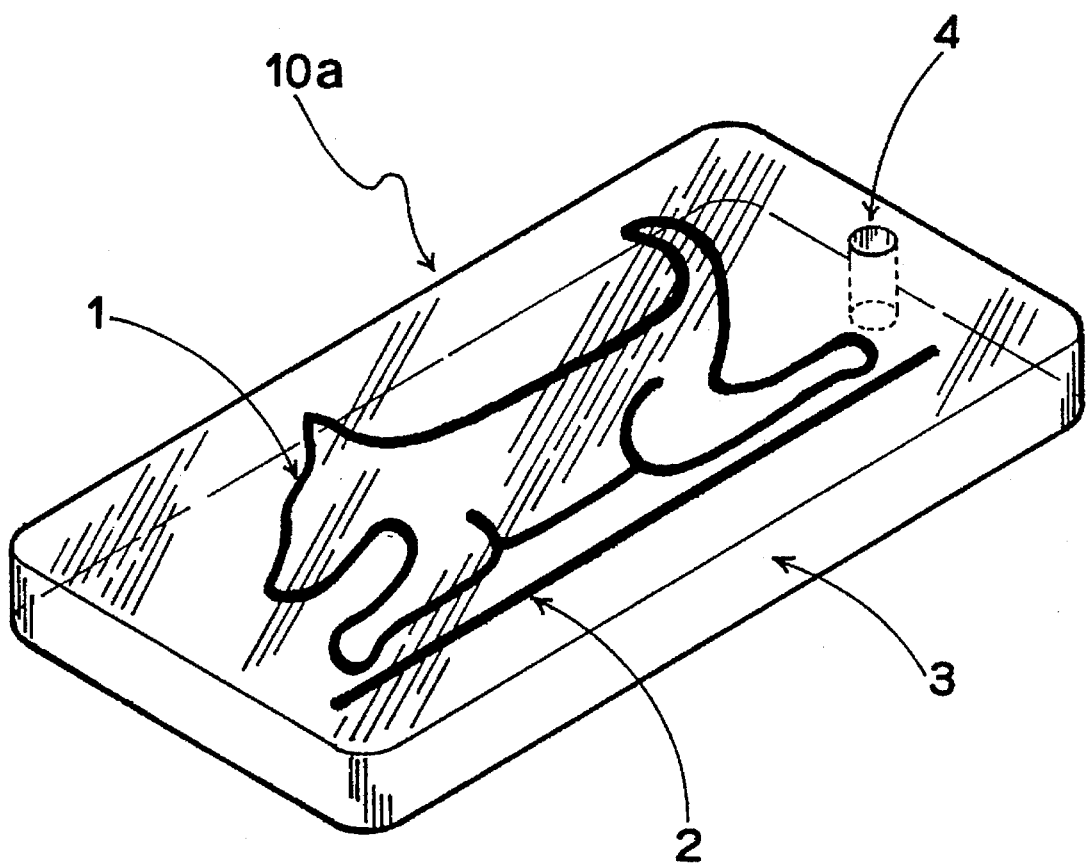
FIG. 1 is a perspective view illustrating the first embodiment of the present invention.
Figure 2:
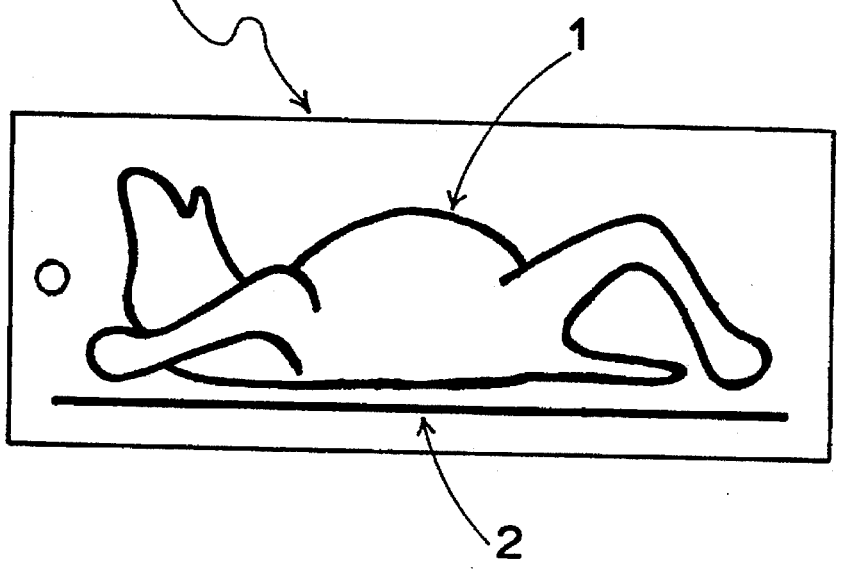
FIG. 2 is a plan view showing the first embodiment of the present invention.

The present invention will be described in detail hereinbelow by referring to the preferred embodiments shown in the accompanying drawings.

EMBODIMENT 1

FIGS. 1 through 4 illustrate the most preferred first embodiment of the present invention wherein reference numeral 1 designates an animal-symbolizing part expressing a design of the profile of a dog with a lead wire having 1 mm diameter, 2 a base line part by which is expressed the top of a flat photographing table with the lead wire as a straight line, and 3 a synthetic resin plate which is molded by such a manner that both the parts 1 and 2 are disposed in a rectangular casting mold, and a liquid acrylic resin of a quick-curing type is casted into the casting mold to obtain the molded resin plate having a thickness of about 4 mm. A relative relationship between the positions of both the parts 1 and 2 can be fixed by embedding the same with the synthetic resin, besides deformations of both the parts in service can be prevented. While a size of the synthetic resin plate 3 is not particularly limited, a length of about 6 to 7 cm and a width of about 3 cm are preferable for the markers used in the prone, supine, and lateral positions shown in FIGS. 1, 2, and 3, respectively, and a length of about 8 cm and a width of about 5 cm are preferable for the marker used in the oblique position shown in FIG. 4. Reference numeral 4 designates a hooking hole defined an end of the synthetic resin plate 3 by which the marker can be hanged on a prescribed hanger resulting in easy arrangement. It is, however, to be noted that such hooking hole is not necessarily required.

Figure 3:
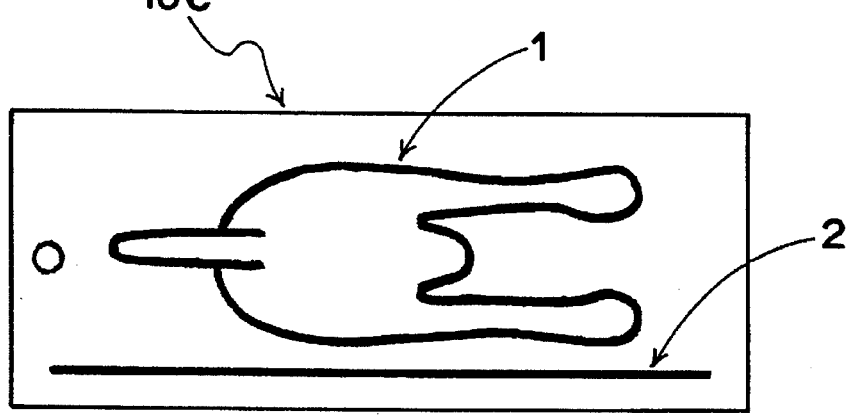
FIG. 3 is a plan view illustrating the first embodiment of the present invention.
Figure 4:
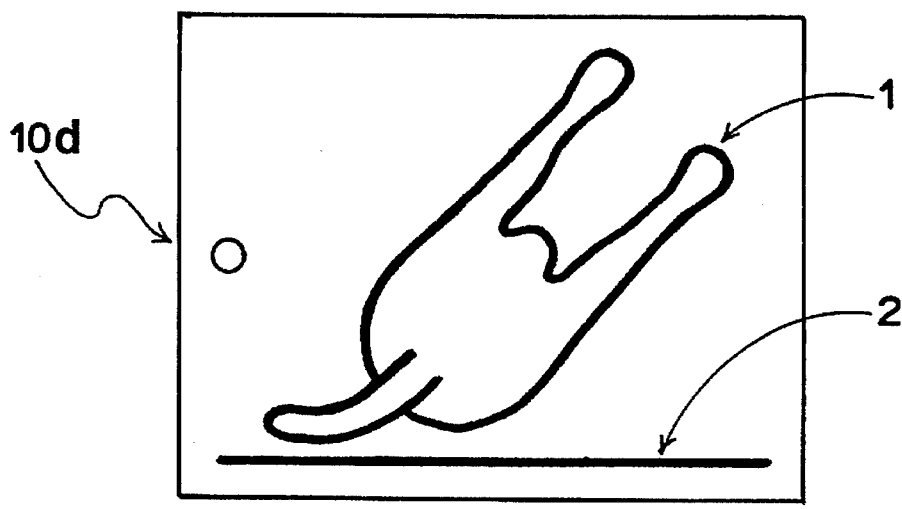
FIG. 4 is a plan view showing the first embodiment of the present invention.

In a marker for specifying the prone position of a dog 10a in Embodiment 1, a base line part 2 which means a flat photographing stand is placed under an animal-symbolizing part 1 expressing the figure of the dog lying with its face down on the top of a roentgenographic stand as shown in FIG. 1. Similarly, in a marker for specifying the supine position of a dog 10b shown in FIG. 2, the figure of the dog lying with its face up is placed over a base line part 2. FIG. 3 shows an example of a marker for specifying the laterally recumbent position of a dog 10c wherein an animal-symbolizing part 1 is designed simply by drawing the profile of the dog, principally the hip and tail thereof, lying with its laterally recumbent position. FIG. 4 shows an example of a marker for specifying the obliquely recumbent position of a dog 10d wherein the hip of the dog is obliquely positioned with respect to a horizontal base line part 2, besides the oblique position is emphasized by the design of a curved tail of the dog.

In Embodiment 1, both the marker for specifying the left-handedly laterally recumbent position of a dog 10c shown in FIG. 3 and the marker for specifying the left-handedly obliquely recumbent position of a dog 10d shown in FIG. 4 serve also as the markers for specifying the right-handed recumbent positions, corresponding to both the lateral and oblique positions, of a dog, respectively. More specifically, in FIGS. 3 and 4, the left side of the dog is positioned over the photographic stand in both the cases. When both the markers are turned over, they can clearly express the right-handedly laterally and right-handedly obliquely recumbent positions of a dog, respectively, by the directions of the designs of the legs and tails thereof. Accordingly, there is no need of such designations of symbols R (right) and L (left) on a film in these cases. Since only one marker is served as two-side applications, the lead wires are embedded in a clear synthetic resin.

EMBODIMENT 2

Figure 5:
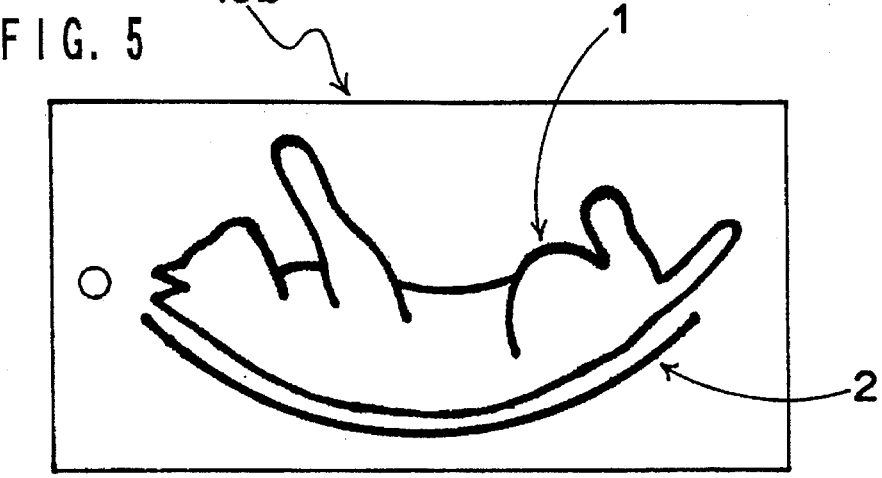
FIG. 5 is a plan view illustrating the second embodiment of the present invention.

FIG. 5 illustrates the second embodiment of the present invention wherein a base line part 2 is expressed by the use of an arcuate lead wire, since the top of a curved photographic stand has a concave section. The marker for specifying the supine position of a cat 10b illustrated is an example in which an animal-symbolizing part 1 expressing a design of the whole body of the cat laying with its face up on a curved table and the arcuate base line part 2 are shown, respectively. In this case, a simple solid wire is not used, but a conspicuous wave-formed lead wire may be used for the sake of emphasizing the base line part 2.

EMBODIMENT 3

Figure 6:
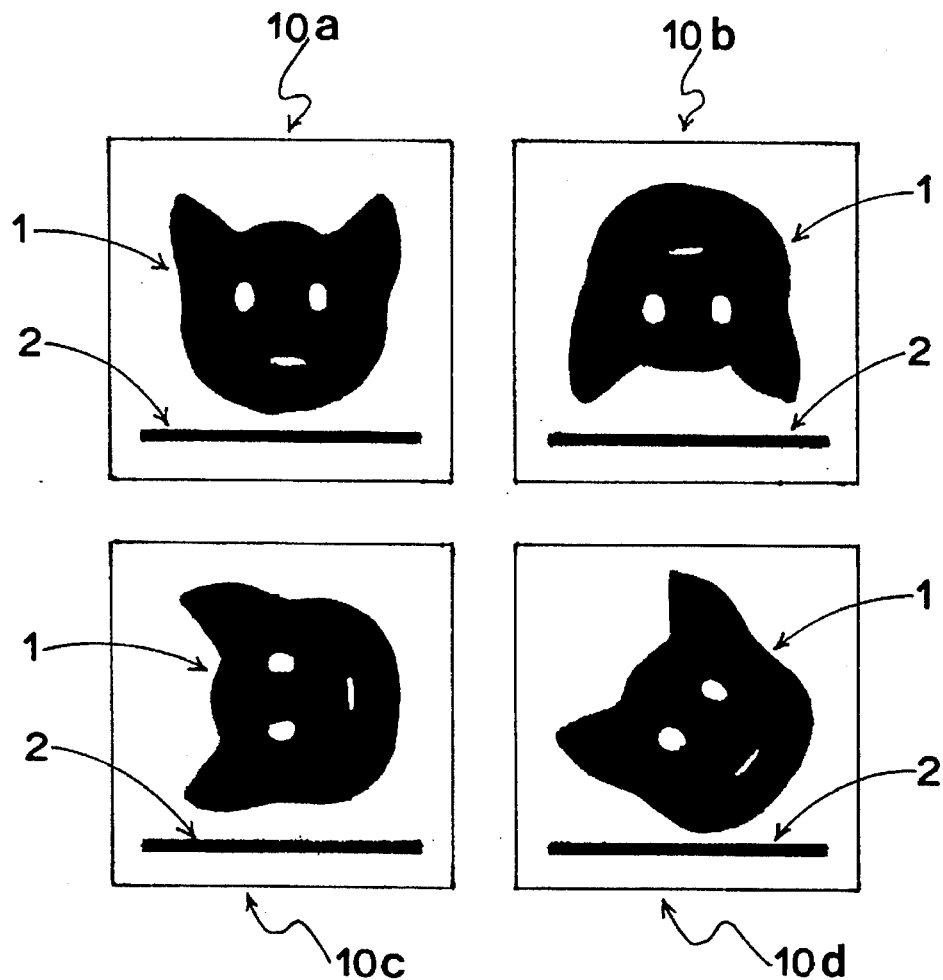
FIG. 6 is a plan view showing the third embodiment of the present invention.

FIG. 6 illustrates the third embodiment of the present invention wherein an animal-symbolizing part 1 and a base line part 2 are shaped by the use of thin lead sheets in place of lead wires. In the present embodiment, while the animal-symbolizing part 1 is represented by a silhouette of a cat's face, a silhouette of the whole body of a cat may be used. Due to a positional relationship between the silhouette and the base line part 2, photographed body postures of an animal can easily be specified.

EMBODIMENT 4

Figure 7:
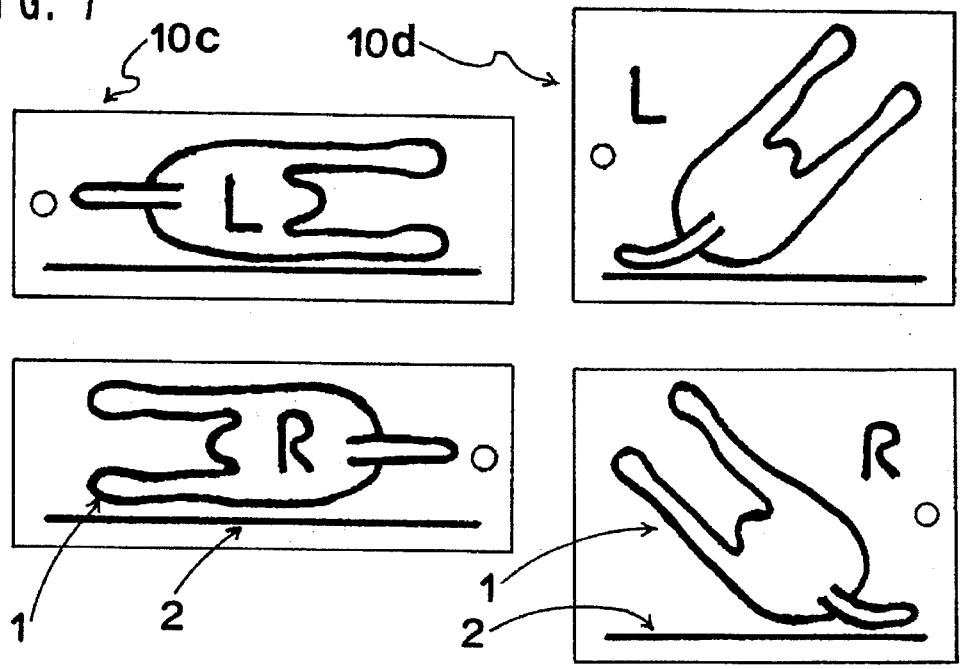
FIG. 7 is a plan view illustrating the fourth embodiment of the present invention.

FIG. 7 shows the fourth embodiment of the present invention wherein two each of markers for specifying laterally recumbent positions of an animal 10c, 10c as well as two each of markers for specifying obliquely recumbent positions of an animal 10d, 10d are further provided with either of a symbol R or L with a lead wire, respectively. By this arrangement, such a mistake that an inexperienced intern takes a wrong marker to be used in the reverse side in case of taking a roentgenogram can be prevented from occurring. Besides, a roentgenogram which has been taken with the marker of the present embodiment indicates clearly a side of the body posture of an animal photographed, so that it is easily understood by even a beginner veterinarian in case of examining the same. In the present embodiment, the rear of the synthetic resin plate may be made to be opaque so that no mistake occurs in respect of the sides of a marker. For example, when a synthetic resin is casted into a casting mold as described in Embodiment 1, first a colored synthetic resin is used for the lower layer of a synthetic resin plate to be prepared, and then a clear synthetic resin is used for the upper layer of the resin plate, whereby the front and the rear of the resulting synthetic resin plate can be discriminated without any mistake.

EMBODIMENT 5

Figure 8:
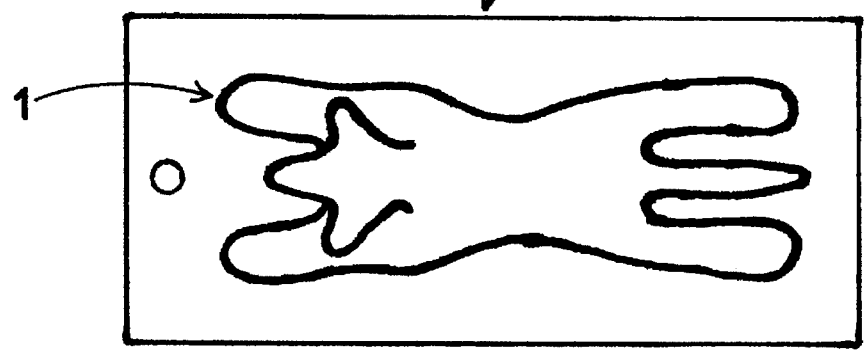
FIG. 8 is a plan view showing the fifth embodiment of the present invention.
Figure 8:
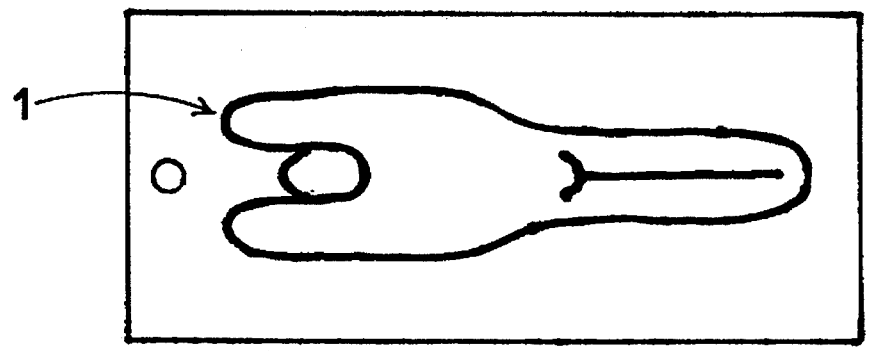

FIG. 8 illustrates the fifth embodiment of the present invention being an example wherein a marker without a base line part can also specify body postures of an animal photographed is shown. More specifically, only an animal-symbolizing part 1 which expresses the design of the profile of an animal laying with its face down by the use of lead wires is adopted in the marker for specifying the prone position of an animal 10a shown in FIG. 8. By the use of this marker of the present embodiment, the photograph taken can clearly and positively specify the animal in its prone position. Likewise, an animal-symbolizing part 1 in the marker for specifying the supine position of an animal 10b shown in FIG. 8 expresses the simple design of the outline of an animal laying with its face up by the use of lead wires.

EMBODIMENT 6

Figure 9:
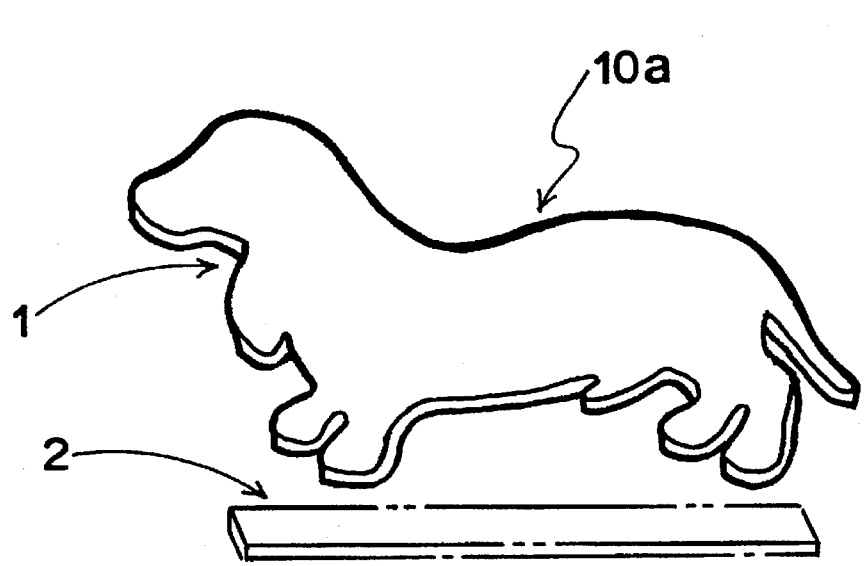
FIG. 9 is a perspective view illustrating the sixth embodiment of the present invention.

FIG. 9 illustrates the sixth embodiment of the present invention wherein an animal-symbolizing part 1 is prepared from a thin metallic sheet such as lead sheet. The resulting animal-symbolizing sheet is used with no more modification or working, i.e. without embedding the sheet into a synthetic resin in the present embodiment. Of course, while the animal-symbolizing part 1 can be used alone as a marker, the animal-symbolizing sheet may be used in combination with a sheet-like base part 2 to specify body postures of an animal in case of photographing the same. In the present embodiment, since a thin metallic sheet which can be easily worked is used, characteristics belonging to kinds and lineages of an animal which is to be photographed are specified like the dachshund illustrated in FIG. 9 as an example. Furthermore, a distinction of sex of an animal to be photographed may be specified on the film, when an animal-symbolizing sheet accompanying with or without a symbolized penis portion is used.

As is apparent from the above description, according to the present invention, body postures of an animal photographed in roentgenograms are specified in accordance with a designed figure of the animal, but not characters or numerical references, so that any person in the world can specify the body postures of an animal photographed in a roentgenogram when he or she takes a glance at the roentgenogram.

Accordingly, unlike the case where such body postures photographed in roentgenograms have been heretofore indicated by alphabetical expressions, even the veterinarians who use usually the characters other than alphabet can also easily specify the body posture of an animal in a roentgenogram irrespective of the characters or languages which are used in their countries or territories, so that they are free from useless puzzlement or confusion in case of examining roentgenograms, and as a result they can take a step of diagnosis for the diseased part without delay.

In general, a skilled veterinarian can easily judge a kind of animals, besides even a breed and the age thereof, when the veterinarian examines merely roentgenograms of a part of skeletons. However, a beginner veterinarian discriminates hardly even a difference between cats and dogs. This problem is peculiar to the veterinary region which cannot imagine in human medical services.

In this connection, surprisingly an unexpected effect can also be obtained by the present invention. More specifically, differences between a variety of animals such as dogs, cats, cattle, horses and the like can be specified on roentgenograms by the use of the film markers each having a simple design which specifies various animals according to the present invention. Thus, troubles puzzling beginner veterinarians can be solved at once.

According to the present invention, not only a specifying effect for the body posture of an animal photographed in a roentgenogram which could not be attained by conventional markers wherein expressions by characters or numerical references have been used is obtained, but also a specifying effect for the kind of an animal is unexpectedly attained.

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A film marker for specifying the body posture of an animal photographed in roentgenograms, said marker comprising a synthetic resin plate, an animal-symbolizing member made of a roentgenopaque material and symbolizing the contour of an animal, and a base member made of a roentgenopaque material and symbolizing the top of an X-ray photographic table, said animal-symbolizing member and said base member being embedded in said synthetic resin plate.

2. A film marker for specifying the body posture of an animal photographed in roentgenograms, said marker comprising a synthetic resin plate, and an animal-symbolizing member made of a roentgenopaque material and symbolizing the contour of an animal, said animal-symbolizing member being embedded in said synthetic resin plate.

* * * * *

UNITED STATES PATENT AND TRADEMARK OFFICE
CERTIFICATE OF CORRECTION

PATENT NO. : 5,657,366
DATED : August 12, 1997
INVENTOR(S) : Masanari Nakayama

It is certified that error appears in the above-identified patent and that said Letters Patent is hereby corrected as shown below:

Column 3, line 27, "8 cm" should read -- 6 cm --

Signed and Sealed this

Twentieth Day of October, 1998

Attest:

BRUCE LEHMAN

*Attesting Officer*  *Commissioner of Patents and Trademarks*